United States Patent [19]
Majumdar

[11] Patent Number: 6,093,271
[45] Date of Patent: Jul. 25, 2000

[54] TIRES WITH COLORED INDICIA

[75] Inventor: Ramendra Nath Majumdar, Hudson, Ohio

[73] Assignee: The Goodyear Tire & Rubber Company, Akron, Ohio

[21] Appl. No.: 09/090,458

[22] Filed: Jun. 4, 1998

Related U.S. Application Data

[63] Continuation-in-part of application No. 08/758,273, Nov. 29, 1996, abandoned, which is a continuation-in-part of application No. 08/448,635, May 23, 1995, abandoned.

[51] Int. Cl.$^7$ .................................................. B29D 30/72
[52] U.S. Cl. ......................... 156/116; 152/524; 152/525
[58] Field of Search .................................. 152/524, 525, 152/DIG. 12; 156/116; 8/513, 514, DIG. 3

[56] References Cited

U.S. PATENT DOCUMENTS

| | | | |
|---|---|---|---|
| 51,848 | 1/1866 | Malcom | 8/513 |
| 1,715,209 | 5/1929 | Morris | 8/513 |
| 1,854,601 | 4/1932 | Porritt | 8/513 |
| 1,895,088 | 1/1933 | Taylor | 8/513 |
| 3,081,276 | 3/1963 | Snyder et al. . | |
| 3,253,634 | 5/1966 | DeYoung | 152/524 |
| 3,449,201 | 6/1969 | Palmquist et al. | 152/524 |
| 3,577,261 | 5/1971 | Klar . | |
| 3,607,498 | 9/1971 | Kubota | 152/524 |
| 3,729,041 | 4/1973 | Kubota . | |
| 4,158,378 | 6/1979 | Pearson et al. | 152/524 |
| 4,987,192 | 1/1991 | Oberster et al. | 525/274 |

FOREIGN PATENT DOCUMENTS

| | | | |
|---|---|---|---|
| 744304 | 11/1996 | European Pat. Off. | 156/116 |
| 01139883 | 6/1989 | Japan . | |
| 04072335 | 3/1992 | Japan . | |
| 1527240 | 12/1987 | U.S.S.R. . | |

OTHER PUBLICATIONS

*Encyclopedia of Polymer Science and Engineering*, vol. 6, pp. 749 and 750, published by John Wiley & Sons, New York, Jan., 1986.

*Polymer Handbook*, pp. IV–337 through IV–347, published by John Wiley & Sons, New York, Jan., 1975

*Rubber Technology Handbook*, pp. 162–169, Hanser Publishers, Munich, Jan., 1989.

Trade Literature from Exxon Chemical Company: Houston, Texas, apparently published Oct., 1993, consisting of 68 printed pages including general fliers, specification sheets, and tire recipes, all related to Exxpro™ products.

*The Vanderbilt Rubber Handbook*, pp. 120, 121, 124, 125, 160, 161, 650 and 651, published by R. T. Vanderbilt Co., Inc., Jan., 1978.

ASTM Method E 308–94a, "Standard Practice for Computing the Colors of Objects by Using the CIE System[1]," published by ASTM, Philadelphia, PA, Jan., 1994, pp. 744–774, *1995 Annual Book of ASTM Standards for Paints, Related Coatings and Aromatics*, vol. 06.01.

*Encyclopedia of Polymer Science and Engineering*, pp. 243, 292–294 and 299–303 published by John Wiley & Sons, New York (Jan. 1, 1988), vol. 13, referring to polyurethane and waterborne polyurethane coating compositions.

European Search Report on European Application EP 96 10 7887 completed Sep. 23, 1997, by Examiner J.L. Baradat in the Hague. This is the European Counterpart to a priority document for the present application.

Maurice Morton, Ed., "Rubber Technology", 3$^{rd}$ ed., pp. 288–293, 308–309, 314–315 published by Van Nostrand Reinhold NY, 1987.

*Primary Examiner*—Geoffrey L. Knable
*Attorney, Agent, or Firm*—Henry C. Young, Jr.

[57] ABSTRACT

This invention relates to a vulcanized rubber substrate such as, for example, a tire and a colored, crosslinked, non-black, non-staining, opaque, rubber composition layer therein such as, for example, a colored sidewall. In one preferred embodiment, the invention relates to such a tire wherein said white sidewall is partially colored with a contrasting color prior to vulcanization. The color is desirably applied after mixing with a plasticizer for the white sidewall composition. During vulcanization the color penetrates and colors the visible portion of the white sidewall composition.

9 Claims, No Drawings

6,093,271

TIRES WITH COLORED INDICIA

CROSS REFERENCE

This application is a continuation-in-part of U.S. application Ser. No. 08/758,273, filed Nov. 29, 1996, now abandoned, which was a continuation-in-part of U.S. application Ser. No. 08/448,635, filed May 23, 1995, now abandoned, and titled TIRES WITH DYED INDICIA both of which are hereby incorporated by reference.

FIELD OF THE INVENTION

The present invention relates to coloring non-black, non-staining, opaque, rubber components in tires to provide tires with one or more colored surfaces. The present invention is particularly directed to coloring the white sidewall portions, the white lettering or the indicia of pneumatic tires. An optional polyurethane coating can further enhance the color and color stability of the dyed article.

BACKGROUND

Heretofore, colored vulcanized elastomers have often been prepared by mixing finely divided pigments with uncured rubber followed by vulcanization of the rubber composition. Such elastomers generally have a very uniform color which is resistant to abrasion in the sense that a pigment is dispersed throughout the rubber composition.

U.S. Pat. No. 3,577,261 provides a quick method for identifying uncured rubber stocks and rubber cements by the effect of a dye therein on an adherent layer applied thereto. The adherent layer includes particulate pigments and a solvent. The solvent picks up dye from the substrate of rubber stock or rubber cement and imparts the color of the dye to the adherent layer. It is implied that the color of the dye within the rubber stock or rubber cement is hard to visually perceive because of colored pigments (such as carbon black) in the substrate.

U.S. Pat. No. 1,895,088 issued January of 1933 and relates to colored stainable rubber products and a method of coloring. The reference teaches volatile solvent-based dyeing of translucent rubbers and color stabilization by a transparent varnish. The reference teaches opaque rubbers mask the dye color and thus should not be used. The reference teaches that staining ingredients migrate in the rubber unless barrier layers are present to inhibit the migration.

White sidewalls and raised white letters on modern pneumatic tires are often composed of stain resistant elastomers, particularly elastomers having large amounts of isobutylene repeating units such as butyl rubber, halobutyl rubber, as well as EPDMs. These butyl rubbers are used so that common contaminants on the roadways (such as motor oils, salt, cinders, and tars) and staining oils and vulcanization accelerators within the adjoining black elastomer portions of the tire do not readily stain or discolor the white regions. These white sidewall compositions are so stain resistant that they do not require barrier layers such as taught in U.S. Pat. No. 1,895,088. White sidewalls of modern pneumatic tires also contain a large percentage of titanium dioxide that has a refractive index much higher than elastomers so that the final white sidewall composition in the tire is opaque. Since a black sidewall is always beneath the white sidewall, high opacity is desired to maximize apparent whiteness.

SUMMARY OF THE INVENTION

In accordance with this invention, a vulcanized rubber composition (pneumatic tire) is provided comprised of an opaque colored rubber composition which desirably contains titanium dioxide pigment as a white colorant in the general absence of carbon black. At least one surface of said white rubber composition is colored by applying a dye prior to vulcanization. Said dye penetrates said rubber composition surface and colors at least one rubber surface with the dye. This process is very commercially desirable as it allows for the production of a multitude of different colored sidewall compounds from a single Banbury mixer and extruder without requiring extensive cleaning and purging of prior pigments or pigmented rubber from said equipment.

A further aspect of the present invention relates to a process for coloring a component of pneumatic rubber tire, comprising the steps of compounding and mixing an opaque non-black rubber compound including a butyl type rubber and a pigment that can opacify the rubber composition, applying a dye to at least one external surface of said opaque non-black rubber compound, assembling said colored rubber compound into a pneumatic tire and finally vulcanizing said tire.

In an alternate embodiment of this invention, a hydrocarbon solvent and an oil soluble dye in the form of a dye solution can be used to swell the vulcanized rubber composition to create a permeable rubber surface to permit a migration, or penetration of the dye into the white pigment-colored rubber. A dyed rubber penetration layer was thereby formed in the surface of the said rubber composition.

A still further aspect of the present invention relates to a pneumatic tire comprising a toroidal shaped, carbon black filled vulcanized rubber composition having integral therewith, a crosslinked, opaque non-black rubber composition comprising at least one hydrocarbon rubber having less than 10 weight percent of polar groups therein, a white pigment, and a hydrocarbon soluble dye absorbed into at least a portion of said crosslinked, non-black rubber composition, said non-black rubber composition having an exposed surface with a CIE 1976 L* value according to ASTM E-308-94a of at least 40.

DETAILED DESCRIPTION OF THE INVENTION

One embodiment relates to any vulcanized rubber article, e.g. tire, generally black because it contains carbon black therein, which has a non-black, hydrocarbon rubber portion thereon or integral therewith. The present invention will be described with respect to coloring a white tire sidewall, the white sidewall being a component in a toroidal-shaped pneumatic tire. It is to be understood that the same technology can also be applied to numerous articles or products such as bumper strips, vehicle protection or trim strips, tennis shoes and the like if made from butyl rubber. The white regions on a tire sidewall are generally prepared by assembling a white colored compounded rubber with the tire forming components during the assembly of a green (uncured) tire. The white colored rubber is desirably crosslinked in the mold with the other portions of the tire. The white colored component is formulated so that it is compatible with the other components and bonds well with the elastomers of the tire.

While a preferred embodiment of the disclosure of the invention relates to coloring an opaque non-black and non-staining tire sidewall, it is to be understood that generally any non-black rubber can be dyed by the disclosed technology. By the term "non-black" it is meant any color or reflectivity which is greater than zero, on the CIE 1976 L* scale such as rubbers which have a CIE 1976 L* value, of at least 40, desirably at least 50, preferably at least 60, and more preferably at least 70, 80, or 85 before dyeing. A pure white color on the CIE 1976 L* scale has a value of 100, while a pure black color has a value of 0. Reference to the CIE 1976 L* scale can be readily found in ASTM E-308-94a.

A preferred method of forming the white regions of the sidewall is to extrude the white colored component. The extruded white colored compound in general tire building processes has a thin skin of a compounded black rubber compound, that matches the composition and color of the tire, which is applied over and covers the white rubber component. This black rubber compound is generally called a coverstrip. When this covered white component is co-cured with the tire and thus adhered or chemically joined thereto, the entire tire sidewall appears to be one black color irrespective of whether raised or depressed regions are present on the tire, such as letters, or rings, logos, etc. The tire manufacturer can then expose the white component (colored component after dyeing) by grinding or abrading away the thin skin (coverstrip) in selected areas to remove the same and expose any desired regions of white (colored) rubber. Typically letters spelling a trade name, tire sizes, shape designation, etc. are raised letters (protrude above the rest of the sidewall) while rings around the tire can be raised or recessed.

Pneumatic tires generally comprise a tread region which is designed to contact the road or path, two or more sidewalls which help contain the air and provide lateral support, and bead areas which make contact with a rim.

The non-black, generally solvent swellable, hydrocarbon elastomers, also called opaque rubber compositions, of the present invention are either substantially free or completely free of polar groups other than small amounts of halogens as in butyl rubber. Desirably, the one or more elastomers have an average of less than 10 weight percent, more desirably less than 5 weight percent, preferably less than 3 or 2 weight percent, and more preferably completely free (i.e., 0 percent) of polar groups. Such polar groups are carboxylic acids; sulfites; sulfates; alkali salts of carboxylic acids; esters, etc., and specifically include amine; sulfonyl; carbonyl; hydroxyl; nitrile; carboxyl; alcohol; ether linkages; and other groups. In calculating these weight percents, only the polar group is considered while attached alkyl or aromatic groups are excluded. Desirably rubbers excluded (i.e., substantially free or completely free of) from this embodiment or used in such small amounts to result in an elastomer blend having less than the above specified amounts of polar groups are butadiene-acrylonitrile polymers, acrylate polymers and other polar elastomers.

Suitable elastomers, colorable by this technology, include copolymers having at least 50, desirably at least 80 and preferably at least 90 weight percent repeating units from $C_4$ to $C_7$ isomonoolefins, lightly halogenated versions thereof (e.g., less than 5 percent by weight halogen), polydiene (i.e., $C_4$ to $C_{12}$) homopolymers or copolymers; copolymers of diene ($C_4$ to $C_{12}$) and vinyl aromatic monomers ($C_8$ to $C_{15}$); natural rubber, ethylene propylene diene monomer rubbers, hydrogenated polymers or copolymers of ($C_4$ to $C_{12}$) dienes, and the like. The lightly halogenated versions of the above polymers are used due to beneficial changes in cure behavior and this is not considered to not result in polar polymers. Said elastomers having at least 50 weight percent $C_4$–$C_7$ monoisoolefins were thought to be dye resistant (commonly called non-staining). Dyes readily migrate in the more conventional rubbers.

Preferable elastomer compositions for white sidewall portions comprise from about 20 or 40 to about 80 parts by weight of a copolymer optionally halogenated, having at least 50 weight percent, more desirably at least 75 weight percent, repeating units from $C_4$ to $C_7$ isomonoolefin monomers (e.g., butyl rubber); more desirably from about 50 or 60 to about 80 parts by weight of said copolymer; optionally up to 30 parts by weight of an ethylene-propylene diene monomers rubber (EPDM); more desirably up to 25 parts by weight of EPDM; and up to 40 or 50 parts by weight of natural rubber or a synthetic homopolymer or copolymer of one or more conjugated diene monomers and optionally vinyl substituted aromatic monomers, more desirably from about 15 to about 40 or 50 parts by weight of said homopolymer or copolymer wherein all parts by weight are per 100 parts by weight (PHR) of total rubbers in the composition.

The carbon black filled portion of a tire sidewall often contains antioxidants and other oil soluble components which tend to discolor or stain many white rubber compounds. The staining antioxidants and other oil soluble components give desirable properties to the tire, which cannot be economically achieved with non-staining components. Therefore, tire sidewall portions which are to be white or light colored, are compounded with large amounts (e.g., greater than 30 PHR, more desirably greater than 40 PHR, and preferably greater than 50 or 60 PHR of rubbers, optionally halogenated, having predominantly (e.g. at least 50 or 75 weight percent) repeating units from one or more isomonoolefin ($C_4$–$C_7$) monomers (e.g., butyl rubber)). The non permeable nature of polymers from isomonoolefin monomers such as isobutylene (e.g., butyl or halobutyl rubber) is the reason why these rubbers are used nearly exclusively (instead of natural rubber or styrene-butadiene rubber) for white sidewalls, innertubes and tire innerliners.

These isobutylene based rubbers as a cured layer slow the diffusion of pressurized air from inside the tire to a negligible rate. Similarly, polymers from isomonoolefins such as isobutylene slow the diffusion of staining ingredients such as oils, thus preventing undesirable staining of white sidewalls. The effect of polymers from isomonoolefins (butyl rubbers) of preventing color migration into the rubber is minimized in this application by applying the color prior to vulcanization and/or applying the color with a low molecular weight compound (e.g. plasticizer oil or wax) or in a less preferred embodiment applying the dye with a solvent that swells the crosslinked rubber and facilitates migration of dye into the rubber. Desirably, the copolymer of at least 50 weight percent isomonoolefin is a copolymer of at least 50 weight percent isobutylene or halogenated isobutylene.

Desirably, the copolymer having at least 50 weight percent of a isomonoolefin comprises butyl rubber (typically a polymer with from about 95 to about 99 weight percent isobutylene repeating units and from about 1 to about 5 weight percent of diolefin repeating units) or chlorinated or brominated butyl rubber (further including from about 0.25 to about 2.5 weight percent halogen, more desirably from about 0.5 to about 1.75 weight percent halogen). Other desired copolymers having at least 50 weight percent of isomonoolefins are derived from polymerizations of $C_4$ to $C_7$ isomonoolefins with p-alkylstyrenes. These copolymers have from about 80 to about 99 weight percent, more desirably from 85 to 98 weight percent isomonoolefin repeating units and from about 1 to about 20 weight percent, and more desirably from about 2 to about 15 weight percent repeating units from p-alkylstyrenes. These polymers of isomonoolefins and p-alkylstyrenes are made by Exxon. A preferred copolymer is a brominated copolymer with up to 5 weight percent bromine, more desirably from about 0.2 to about 1.5 or 2.5 weight percent bromine, and from about 85 to about 98 weight percent isobutylene repeating units and from about 2 to about 15 weight percent repeating units from p-methylstyrene. The predominate site of bromination is the p-methyl group.

Desirably the ethylene propylene diene monomer (EPDM) copolymer comprises repeating units of from about 20 to about 90 weight percent, and more desirably from about 30 to about 85 weight percent ethylene, from about 10 to about 80 weight percent, more desirably from about 15 to about 70 weight percent of at least one alpha olefin having from 3 to 16 carbon atoms (usually mostly propylene) based on the total repeating units from ethylene and alpha olefins having from 3 to 16 carbon atoms, and from about 0.1 to about 0.8 moles of one or more nonconjugated dienes having from 6 to 12 carbon atoms per kilogram of EPDM polymer.

Said synthetic polymer is desirably comprised of at least 50 and usually at least 70 weight percent repeating units derived from one or more conjugated diene monomers having from 4 to 8 or 12 carbon atoms. Natural rubber (cis 1,4-polyisoprene) is preferred. A desirable comonomer for the residual of the copolymer is vinyl aromatic monomers of from 8 to 12 carbon atoms such as styrene. Preferred polymers include polybutadiene and polyisobutylene. Polar monomers such as acrylates, acrylics, itaconic acid, etc., if utilized at all, are only used in amounts so the total amount of polar groups do not exceed the specified percentages. Other non-polar monomers can also be used in the polymers or copolymers of this elastomer.

The solvent swellable rubber compositions of the present invention can be colored prior to and concurrently with curing (vulcanization or crosslinking) or by using solvents they can be dyed after curing.

The process where the opaque non-black rubber compounds are coated with a mixture of color in a rubber plasticizer prior to vulcanization, where color penetration and color trapping occurs concurrently with curing, is highly preferred as it results in more intense colors with good color retention. The process is also very time effective (the dye colorant mixed with a plasticizer can be quickly applied in the current manufacturing processes) and none of the color and plasticizer has to be removed from the rubber composition. The dye colorant is mixed with conventional rubber plasticizing additives such as oils, waxes, etc. and is free from volatile solvents. The process yields a color containing opaque compound that can be used immediately because there is no solvent that has to be evaporated). To be effective additives for the dyes, to be applied to the uncured rubber compositions, the additives need to be low molecular weight liquids at temperatures in the range from 20° C. to 120° C. The fact that they are liquids in this temperature range means they can help the dye to migrate and become uniformly dispersed in the rubber compound either during storage or during tire vulcanization. The additives used to apply the dye desirably have number average molecular weights below 10,000. These additives desirably have vapor pressures of less than 76 mm of Hg at 100° C. while solvents generally have much higher vapor pressures at that temperature.

For less preferred embodiments using solvents and dyes to color crosslinked rubber the crosslink density is generally measured by volume swelling capacity with a good solvent. Lower crosslink density is associated with fewer crosslinking occurrences per polymer chain, and low crosslink density results in greater swelling capacity of the cured rubber in a good solvent. Suitable swelling determined by percent volume increase using cyclohexane solvent is at least 50 percent, and more desirably at least 75 percent, 100 percent, or 125 percent, and preferably at least 150 percent or 175 percent by volume after soaking overnight at room temperature, i.e., 24 hours at 25° C.

Known crosslinking agents (also known as curatives) which can be used include sulfur, sulfur accelerators, peroxides, other non sulfur curatives, sulfur donor compounds, etc. Sulfur accelerators include guanidines, thiurams, dithiocarbamates, thioureas, thiazoles, sulfenamides and xanthates.

Peroxides include dialkyl peroxides, peresters, hydroperoxides, peroxydicarbonates, etc. Crosslinking agents also include zinc oxide, etc. The use of these crosslinking agents, their effective amounts, etc., are well known to the art. Vulcanization is a subset of the crosslinking process. Crosslinking agents are also known as curatives. Crosslinking is often called curing in the art of rubber processing.

Fillers can be added to the non-black, solvent swellable rubber composition. Fillers generally are particulate material added to either reduce the total cost or to enhance the stiffness and/or modify the chemical resistance of a composition. Reinforcing fillers tend to enhance the strength of a composition. While carbon black can be utilized, it is not desirable in non-black articles and hence is used in low amounts such as less than 2 PHR, more desirably less than 1.5 or 1 PHR, and preferably less than 0.5 or 0.25 PHR such that the composition would not be black and would be capable of reflecting some colored light as a result of dyeing. Preferably, the dyed elastomers of the present invention are substantially free if not completely free, that is zero parts of carbon black per 100 parts of rubber. Rubber compositions with more than these amounts are generally referred to as black surfaces while those with less than these amounts are generally referred to as non-black.

Suitable and desired fillers include talc, clay, silica, calcium carbonate, etc. These may function in addition as pigments or pigment extenders but their principal function is as fillers. Pigments are desirably added to the composition. Desirably only white pigments are added since white can be dyed to any other color. Thus, any white or non-black pigments which reflect light can be used in these rubber formulations. Desirably, the pigments used have good color retention during aging and resistance to discoloring or degrading on U.V. exposure or they are formulated with age resistors or U.V. protectors to provide color integrity in the final product. The pigments desirably are insoluble in the elastomer component and are consequently dispersed in particulate form. Desirable pigments include titanium dioxide, zinc oxide, white lead and antimony oxide, as well as precipitated silica, calcium silicate, calcium carbonate, treated clays, talc, and whiting. Desirably the pigments are used in an effective amount to make the opaque rubber composition in fact opaque rather than translucent or clear. The preferred pigment is $TiO_2$ which is used here to define any coated or uncoated $TiO_2$ pigment used as a white pigment. Desirable amounts of $TiO_2$ are at least 20 PHR, more desirably at least 30 PHR and preferably at least 40 PHR. In order to avoid ambiguity about what is opaque, applicants define opaque as a sample of 1 mm thickness, more desirably 0.5 mm thickness, having less than 2% and more desirably less than 1%, and preferably less than 0.5% change in the CIE L* value when a black backup plate is substituted for a white backup plate in the measurement. This basically defines opaque as the condition where substantially no measurable light can transverse the sample to the backup plate and back to the surface.

Other additives added to the rubber composition can include processing aids which generally enhance a composition's speed and ease of processing. They may function by reducing an elastomer's molecular weight or by lubricating the elastomer's surface. Age resistors and U.V. protectors may be added to the composition. Waxes are desirably used because they tend to bloom to the surface and protect the elastomer immediately below the waxy surface. The additives may absorb or neutralize harmful materials or energy or they function to block a mechanism of aging or degradation.

While processing oils are often used in rather large amounts in tires and other molded or shaped elastomer articles, if utilized in the non-black, solvent swellable rubber, they are desirably utilized in small amounts. To enhance the compatibility of the elastomer with the dye, the oil generally has the same solubility parameter as the elastomer and/or the solvent for the dye and thus are compatible therewith. Small amounts of oils are from about 1 or to about 15 PHR and desirably from about 2 to about 10 PHR. The process oils can include non-staining oils such as naphthenic, paraffinic, and the like.

The hydrocarbon solvents which can be utilized to swell the non-black hydrocarbon rubber compositions generally have a solubility parameter of from about 12 to about 20, desirably from about 13 to about 18, and preferably from about 14 to about 17.5 $[J/m^3]^{1/2} \cdot 10^{-3}$. Such solvents can be identified in the Polymer Handbook, Second Edition, edited by J. Brandrup and E. H. Immergut, John Wiley and Sons, New York, N.Y. (1975), pages IV-337–347, which is hereby fully incorporated by reference. If a blend of two or more different solvents is utilized, the solubility parameter of the overall blend generally lies within the above-noted ranges. Generally, but not always, solvents which have such suitable solubility parameters can be classified as terpene based solvents such as KNI Solvent-2000, and the like; various naphtha solvents such as high flash naphthas, petroleum naphtha, mineral spirits, and the like; various fuel oils such as kerosene, fuel oil no. 2, fuel oil no. 4, and the like; various alkanes including halogenated alkanes such as cyclohexane, hexane, heptane, octane, decane, dodecane, methylene chloride, chloroform, and the like; and various aromatic solvents including halogenated aromatics such as toluene, various Tolusols generally containing $C_7$ hydrocarbons and significant amounts of aromatic compounds therein, xylene, dichlorobenzene, and the like. Another, but not highly desired class of solvents include the various ethers, desirably those having a high molecular weight such as diphenyl ether, and the like. Preferred solvents include RE-ENTRY® KNI Solvent-2000, a terpene based solvent from Envirosolv Inc., also d.b.a. Environmental Solvents Corporation of Jacksonville, Fla. and Shell Sol™ 142HT from Shell.

The hydrocarbon solvents with the exception of halogenated solvents are generally substantially free or completely free of polar atoms and/or groups. That is, the weight of the total number of any polar atoms and/or groups therein is generally less than 10 percent by weight, desirably less than 5 percent by weight, more desirably less than 3 or 2 percent by weight, and preferably nil, that is, zero percent by weight based upon the total weight of the solvent. Polar atoms include oxygen, nitrogen, sulfur, and the like. Polar groups are defined with respect to the hydrocarbon elastomers. Although halogenated solvents are suitable even though they are polar, they are generally not desired due to environmental reasons.

The desired non-polar solvents are generally poorly hydrogen bonded except for the ethers which are moderately hydrogen bonded. Otherwise, moderately hydrogen bonded and strongly hydrogen bonded solvents are avoided and thus are not within the scope of the present invention inasmuch as they generally do not effectively swell non-black rubber compositions. Moderately hydrogen bonded solvents which are avoided, generally include various esters, ketones, glycol monoethers, and the like. Strongly hydrogen bonded solvents include various alcohols, amines, acids, amides, aldehydes, and the like. Numerous examples of solvents having the above noted solubility parameters as well as being characterized as poorly, moderately, or highly hydrogen bonded are set forth in the Polymer Handbook.

Another desired attribute of the hydrocarbon solvents of the present invention is that they have a flash point of at least 100° F., (38° C.) more desirably at least 125° F. (52° C.), and preferably at least 140° F. (60° C.); have no health effects at the typical exposure levels; and are not hazardous to the environment (desirably they are biodegradable). Desirably, the solvent has low ratings such as a total rating of 5 or less, and desirably 3 or less based upon the National Fire Protection Association's classification on labeling and properties of flammable liquids (health, flammability, and reactivity ratings).

Dyes are generally defined as compounds which contain groups that confer color, generally called chromophores. More information on dyes in general is available in "The Chemistry of Synthetic Dyes," volumes I and II by K. Venkaktaraman, 1952, published by Academic Press, Inc., New York, and in "Organic Chemistry," by W. T. Caldwell, 1943, published by Houghton Mifflin Company in its chapter entitled "Synthetic Dyes," pages 702–725. The dyes desirably are soluble in the low polarity or non-polar hydrocarbon solvents and/or soluble in the poorly hydrogen bonded solvents and are generally free of pigments. Desirably these dyes are soluble to the extent of from about 0.0001 to about 1.0, desirably from about 0.001 g to about 0.9, and preferably from about 0.01 to about 0.08 grams per 1.0 gram of solvent when the solvent has a solubility parameter of from about 12 to about 20, etc., with the solvent being further characterized as being generally a non-polar and/or a poorly hydrogen bonded solvent. Suitable dyes desirably include azo, diazo, quinoline, anthraquinone, indo, ketone imine/methine dyes or derivatives thereof, as well as combinations thereof. Preferred dyes include the azo and quinoline dyes. The synthetic dyes can also be derivatives of aromatic hydrocarbons such as benzene, toluene, naphthalene, and anthracene. Preferred dyes are Akrodye™ Oil Violet IRS E-705 solvent violet 13 (9,10-anthracenedione)-; 1-hydroxy-4-[(4-methylphenyl)amino], Akrodye™ Oil Orange #3 E-7174 solvent yellow 14, and Akrodye™ Oil Brown E-8855 solvent red 2 available from Akrochem Corp. in Akron, Ohio. Other dyes that can be used include Morplas Yellow 33, a quinoline type (2(2-quinolylmethylene) phthalide); Morplas Red 46, an anthraquinone dye (9,10-anthracenedione, 1-(alkyl-amino)); Automate® Yellow 126, an azo dye, also known as solvent yellow (1-phenyl-3-methyl-4-(alkylphenylazo)-5-pyrazolone; Automate® Red b, a diazo dye also known as solvent red 164 (2-naphthalenol[(phenylazo)phenyl]azo alkyl derivatives); Akrodye™ Oil Yellow #6, solvent yellow 56, a mono azo dye; Akrodye™ Oil Red #1, solvent red 26, a diazo dye; Akrodye™ Oil Green #1, solvent green, an azo anthraquinone dye; Ceres™ Red; Akrodye™ E8855 Brown Powder; Pylakrome™ Red LX-1903 (diazo, solvent red 24, 26) (also known as (aka) CAS# 85-83-6 and CAS# 447-7-79-6); Pylakrome™ Yellow LX-1913A (monoazo, solvent yellow 29 and 56) (aka CAS# 6706-82-7 and CAS# 2481-

94-9); Pylam™ Blue LX-7270 (anthraquinone, solvent blue 36 and 58) (aka CAS# 14233-37-5 and CAS# 2987-08-9); and Akrodye™ Oil Blue #8, solvent blue 59, an anthraquinone dye.

The present invention relates to coloring (e.g. dyeing) generally any type of the above-noted non-black, solvent swellable, rubber compositions, including those contained on a crosslinked substrate such as vehicle bumpers or trim, shoes, e.g., tennis shoes, and the like. The crosslinked substrate can also be a tire, for example, e.g., pneumatic tires as used on vehicles (cars, trucks, etc.) construction equipment tires, agricultural equipment tires, cart tires, wheelbarrow tires, recreation equipment tires (all terrain vehicles, motorcycles), bicycles tires, and the like.

Other uses of the dyed portion of non-black rubber compositions include the identification or origin of goods, the identification of trademarks or tradenames, the selective application of the dye for identifying marks (such as lot number, batch type, customer, supplier, and part number), and the like. Goods can also be customized or further colored by use of dyeing thereby enhancing their desirability and marketability. The dyeing of the non-black rubber compositions can be accomplished by any means including those which place the organic soluble dye solution in contact with the rubber article to be dyed. The dye or dye solution (dye in compounding ingredients or dye in solvent) can be applied in any conventional means such as with a cloth, sponge, brush, roller ball, felt tipped marker etc or by dipping, spraying, etc.

Very small quantities of the dye are usually necessary. The quantities needed to impart a desired or appealing, suitable, color is readily determined by one skilled in the art. If the dye is applied to an uncrosslinked rubber composition the dye can be from 1 or 2 wt. % of the solution applied to about 100 wt. %. Generally for dying crosslinked rubbers from about 0.5 to about 10 parts, desirably from about 0.75 to about 5 parts, and more desirably from about 1 to about 3 parts by weight are mixed with 100 parts by weight of the hydrocarbon solvent to form a dyeing solution. These dilute solutions are desirable as the swelling of the rubber by the solvent facilitates dye penetration.

Typically, the dye dissolved in the hydrocarbon solvent is selectively and/or topically applied to at least one external surface of the above-noted swellable, non-black, mildly crosslinked rubber composition. The solvent containing the dye penetrates and swells the rubber composition creating a permeable layer. That is, the dye solution is absorbed into the rubber with the dye therein. Subsequently, the solvent evaporates leaving the dye within the rubber. The result is a dye penetration layer which is located in the exterior of the non-black rubber composition. The depth thereof can vary depending upon the concentration of the dye, the amount of the dye solution applied and the number of applications of the dye solution. Generally, the depth ranges up to the thickness of the non-black rubber, or up to about 80 or 100 mils and desirably from about 5, 10, or 15 to about 20, 30, or 50 mils.

Initial penetration of the dye dissolved in the hydrocarbon solvent into the rubber according to the present invention is very rapid and occurs within a matter of seconds. As the solvents used are compatible with the non-black crosslinked rubber, they are absorbed therein. The high concentration of solvent in the surface of the rubber is simultaneously depleted by evaporation of the solvent from the surface and migration of the solvent and dye from the surface to deeper in the rubber. Additional applications of dye solution to the surface can allow the dye solution to penetrate deeper into the rubber. With stain resistant rubber formulations such as those containing at least 20 PHR of a copolymer having at least 50 mole percent repeating units from isomonoolefins, the dye solutions penetrate significantly slower than in rubber formulations wherein repeating units from conjugated diene monomers predominate in the rubber.

Inasmuch as the dye solution migrates from the outward or external surface of the non-black rubber generally located on a black rubber, highly crosslinked composition substrate, a dye gradient is often formed wherein the amount of dye generally diminishes inwardly with distance from the surface. This results in the dye being present in higher concentrations at the exterior dyed surfaces than the average concentration in the crosslinked rubber composition. The dye will not affect the color of the black crosslinked substrate.

The selective application and formation of a penetration dye layer in a rubber according to the present invention differs from painting since the dye solution penetrates into the swellable elastomer and the remaining dye cannot be removed by abrasion of the surface, as with paints or coatings.

In another embodiment it has been discovered that substantially transparent coatings on the dyed rubber surfaces can enhance the measured color intensity and can contain light stabilizers to protect the dye from harmful light frequencies or stabilize the dye with respect to those frequencies. A variety of clear coating compositions could be used to coat dyed rubber substrates. Factors to be considered are the adhesion of the coating material to rubber, abrasion resistance of the coating, and flexibility of the coating. Polyurethane coatings are preferred for whitewalls of tires due to their flexibility, adhesion, and scratch resistance. Aliphatic polyurethanes are preferred due to their U.V. resistance The urethane desirably has a low Tg such as −20° C. or lower. Water based coatings are preferred due to their lower volatile organic content. Coatings are desirably from about 20 $\mu$m to about 500 $\mu$m thick and more desirably from about 50 $\mu$m to about 300 $\mu$m thick. Desirably the coating increases at least one of the yellowness (b*), blueness (−b*) or redness (a*) indices of said non-black rubber composition by 100% over the dyed non-black rubber composition without said coating as determined by the ASTM E-308-94a test method using a Hunter Ultrascan™. More desirably the coating increases at least one of said color indices by at least 200%, or increases all of the yellowness, blueness and redness by at least 100%. The polyurethane coatings can be crosslinked with melamine crosslinkers such as Sancure® 89 a modified melamine crosslinker available from the B.F. Goodrich Company, Brecksville, Ohio or multifunctional carbodimides such as Ucarlnk® XL-29SE available from Union Carbide, Danbury Conn.

Water based polyurethane dispersion are commercially available from a variety of suppliers. U.S. Pat. Nos. 5,017, 673; 5,194,487; 5,227,422; 5,331,039; and 5,369,152 describe coating compositions that include a urethane dispersed in water. The polyurethane dispersions desirably include the reaction product of polyisocyanates (often aliphatic polyisocyanates) and polyether or polyester polyols. Dispersing agents can be added as separate components or can be reacted onto the polyurethane. Ionic groups (e.g., anionic and cationic) can be attached to the polyurethane or nonionic groups such as poly(ethylene oxide) can be attached to the polyurethane to make it dispersible in water. A variety of additives including adhesion promoters can be added to the urethane coating. The polyurethane particles normally coalesce into a film upon drying. The water and solvent resistance of the film can be enhanced by crosslinking. The carboxylic acid functionality present in many anionic modified polyurethanes can be crosslinked with polyfunctional aziridines. Alkoxylated melamine formaldehyde resins can crosslink some urethane dispersions. As the coating is heated to elevated temperatures, crosslinking occurs through the reaction of the methoxylated melamine resin with the urea or urethane groups in the polymer. Water dispersible blocked polyisocyanates and aqueous crosslinking agents can also result in polyurethane coatings.

EXAMPLES

Examples I, J, L, and M (after Table VIII) illustrate a preferred embodiment of coloring prior to vulcanization. The intervening examples illustrate dyeing of crosslinked compositions.

The following examples illustrate how the organic soluble dye can be transferred into swellable crosslinked elastomeric compositions and especially white sidewalls. Table I shows a typical formulation for a white tire sidewall. A 6"×6"×0.094" cured sheet of the white sidewall compound of Table I was prepared by molding in a bladder mold for 28 minutes/300° F./100 psi bladder pressure/30 tons platen pressure. Then 1"×1"×0.094" test pieces were clicked out from a bigger sheet for dyeing experiments.

TABLE I

| Material | Parts |
| --- | --- |
| Natural Rubber | 35 |
| Chlorobutyl Rubber | 60 |
| EPDM | 5 |
| Clay | 55 |
| TiO$_2$ | 45 |
| Processing aids | 7.5 |
| Fatty acid | 1 |
| Mix well in an intensive mixer such as two roll mill, Banbury, or Brabender | |
| Sulfur | 1.2 |
| Sulfur accelerators | 2.0 |
| Zinc oxide | 5 |
| Antidegradant | 1 |
| Further mix in an Intensive mixer | |
| Total: | 217.7 |

A 1"×1"×0.094" test piece of the white tire sidewall compounds disclosed in Table I was dipped into a solution of a mono azo dye, i.e., Akrodye™ Oil Yellow #6 (E-6089) (2 g per 100 g solvent) at 40° C. in a terpene based KNI Solvent-2000 for 5 minutes. The sample was then removed, dried, and a cross-section cut was made to determine the extent of penetration. The dye penetration under these conditions was total, i.e., about 47 mils (1.19 mm).

The above mentioned dyeing experiments were repeated using Akrodye™ Oil Red #1 (E-5883) in a variety of solvents for overnight soaking. As soon as test pieces were taken out from the solvent, swollen lengths were determined using Vernier Calipers and from which the % volume swell were calculated and are reported in Table II. The solubility parameters and the hydrogen bonding capacity of different solvents were taken from the Polymer Handbook whenever available and are also reported in Table II. The dye penetration whenever needed was measured using Vernier Calipers.

TABLE II

| Solvent | Solubility Parameter (J/m$^3$)$^{1/2}$ · 10$^{-3}$ | Hydrogen Bonding* | Dye Penetration (Mil) | Volume % Swell |
| --- | --- | --- | --- | --- |
| Cyclohexane | 16.8 | p | Total | 141.4 |
| m-Xylene | 18 | p | Total | 137.4 |
| Toluene | 18.2 | p | Total | 129.5 |
| KNI-2000 | 17.2 | p | Total | 108.7 |
| Decane | 13.5 | p | Total | 102.2 |
| Mineral Spirits | | | Total | 97 |
| n-Hexane | 14.9 | p | Total | 96.7 |
| n-Heptane | 15.1 | p | Total | 90.4 |
| Methylene Chloride | 19.8 | p | Total | 81.6 |
| Dodecane | 16.2 | p | Total | 68.1 |
| Diethyl Ether | 15.1 | m | Total | 57.3 |
| Pyridine - Control | 21.9 | s | 0.0625 | 14.3 |
| 1,4-Dioxane | 20.5 | m | 0.09 mil | 14.0 |
| Acetone - Control | 20.3 | m | 0.066 | 0.75 |
| Isobutyl Alcohol - Control | 21.5 | s | Surface | −2.0 |
| Methanol - Control | 29.7 | s | Surface | −3.4 |
| Isopropanol - Control | 24 | s | Surface | −3.6 |
| Perfluoroalkane 70 | 12.0 | p | None | −4.9 |

*p = poor, m = medium, and s = strong hydrogen bonding.

As apparent from Table II, the hydrocarbon solvents of the present invention having solubility parameters between 13 and 18 as well as low amounts of polar groups and generally poor hydrogen bonding resulted in good penetration of the dye as well as good volume swell of the non-black rubber. In contrast, polar containing compounds such as alcohols, ketones, nitrogen containing compounds, and the like, resulted in poor dye penetration and low volume swell.

Four samples of cured rubber having dimensions of 1"×1"×0.1" (2.54×2.54×0.254 cm) were prepared according to the formulations in Table III. Samples B, C, and D had 2, 4, and 6 times the curative concentration of Sample A. This resulted in higher crosslink densities in samples B, C, and D, which restricted their ability to swell with toluene solvent as shown in the volume percent swell test. The reduced swelling of samples B, C, and D resulted in a slower rate of dye penetration and shallower dye penetration as shown by the dye penetration values.

TABLE III

| Materials | A | B | C | D |
| --- | --- | --- | --- | --- |
| Natural rubber | 70.00 | 70.00 | 70.00 | 70.00 |
| SBR-1502 | 30.00 | 30.00 | 30.00 | 30.00 |
| Silane treated clay | 27.5 | 27.5 | 27.5 | 27.5 |
| Titanium dioxide | 37.00 | 37.00 | 37.00 | 37.00 |
| Naphthenic/paraffinic medium process oil | 1.00 | 1.00 | 1.00 | 1.00 |
| Stearic acid | 1.5 | 1.5 | 1.5 | 1.5 |
| Diphenyl guanidine | 0.15 | 0.3 | 0.6 | 0.9 |
| Benzothiazyl disulfide | 1.5 | 3.0 | 6.0 | 9.0 |
| Zinc oxide | 20 | 20 | 20 | 20 |
| Polymeric hindered phenol | 1.5 | 3.0 | 6.0 | 9.0 |
| Insoluble sulfur | 2.75 | 5.5 | 11.0 | 16.5 |
| Dye penetration | 0.038" | 0.037" | 0.028" | 0.011" |
| Volume percent swell | 174 | 152 | 118 | 75 |

The volume percent swell test was conducted by soaking a 1"×1"×0.1" (2.54×2.54×0.254 cm) sample in toluene overnight and then measuring the increase in the largest dimension of the sample. The increase in the dimension was cubed to give volume percent swell.

The dye penetration was conducted by dipping a 1"×1"×0.1" (2.54×2.54×0.254 cm)" sample in a solution of Akrodye™ Oil Red #1 in KNI Solvent-2000 for 20 minutes. The dye concentration was 2 grams per 100 ml of solvent. After the sample was removed, the solvent was allowed to evaporate and the dyed sample was cut in half. The dye penetration was then measured using Vernier Calipers after drying at room temperature.

Utilizing the general white rubber formulations set forth in Table IV with the specific rubbers set forth in Table V, other non-black cured rubber 1"×1"×0.076") examples were made and dyed utilizing 2 g of Akrodye™ Oil Red #1 in 100 g of KNI Solvent-2000. The dye was applied by dipping the test piece for 20 minutes at room temperature. The results are set forth in Table V.

TABLE IV

| | Material | Parts |
|---|---|---|
| First Mix | Polymers (see E, F, G, & H) | 100 |
| | Clays | 27.5 |
| | TiO$_2$ | 37 |
| | Processing Oil | 1 |
| | Fatty Acid | 1.5 |
| Second Mix | Benzothiazyl disulfide | 1.5 |
| | Diphenylguanidine | 0.15 |
| | Antioxidant | 1.5 |
| | Sulfur (80%) | 2.75 |
| | Zinc Oxide | 20 |
| | Total: | 192.9 |

TABLE V

DYEABILITY OF WHITE COMPOUNDS BASED ON DIFFERENT RUBBERS
All Compounds Exposed to Red Dyeing Solution for 20' @ RT
Sample Thickness = 0.076"

| Example | | |
|---|---|---|
| | E | F |
| Rubbers | Natural/EPDM | Natural/SBR |
| Natural | 50 parts by weight | 70 parts by weight |
| Clorobutyl | | |
| EPDM | 50 parts by weight | |
| SBR | | 30 parts by weight |
| Dyeable? | Yes | Yes |
| Penetration Depth | >0.038" | >0.038" |

| | G | H |
|---|---|---|
| Rubbers | Natural | Natural/Chlorobutyl |
| Natural | 100 parts by weight | 50 parts by weight |
| Chlorobutyl | | 50 parts by weight |
| EPDM | | |
| SBR | | |
| Dyeable? | Yes | Yes |
| Penetration Depth | >0.038" | >0.038" |

As apparent from the Table V where the dye penetrated >0.038" from both sides of the samples to dye the entire sample (0.076"), various types of cured elastomers were readily dyeable throughout the total thickness of the rubber.

The recipe set forth in Table I was modified by adding various amounts of carbon black thereto. 6"×6"×0.094" cured test panels were dyed by dipping in a solution of Akrodye™ Red #1 (E-5883) in KNI Solvent-2000 (2 g dye in 100 ml solvent). Colors were compared before and after dyeing and also their L* values were measured using a Hunter Ultascan equipment and the results are reported in Table VI.

TABLE VI

Effect of carbon black content in tire white sidewall conpound on dyeability as measured by ASTM E 308, Commission Internationale de 1'Eclairage (CIE) publication No. 15.2 (CIE) indices (L*)

| % Carbon Black | Dyeing | L* | Visual Color |
|---|---|---|---|
| 0 | Before | 87.53 | White |
| 0 | After | 69.49 | Pink |
| 0 | % Diff | 20.61 | High |
| 0.5 | Before | 56.49 | Med Gray |
| 0.5 | After | 52.03 | Gray-Purple |
| 0.5 | % Diff | 7.90 | Medium |
| 2.0 | Before | 40.07 | Slate Gray |
| 2.0 | After | 39.69 | Dark Slate |
| 2.0 | % Diff | 0.95 | Low |

As apparent from Table VI, the amounts of carbon black within the rubber are kept very low so that L* values before dyeing are at least 40. Otherwise, the rubber is simply not defined as a non-black rubber.

Table VII relates to dyes that were in accordance with the concepts of the present invention and dyes that did not work. Approximately 2 grams of dye was dissolved/dispersed in 200 ml of KNI Solvent-2000. To this was added the 1"×1"×0.14" of cured control white sidewall test pieces (prepared from 35 natural/65 Chlorobutyl+EPDM), i.e., Table I. It was taken out after overnight soaking and then cut into two pieces to examine dye penetration. The dye is said to have worked if it penetrated totally, otherwise it did not work. Just surface coating and penetration less than total on overnight soaking is considered as non-dyeing. Dyes that worked and that did not work are tabulated below.

TABLE VII

| Dyes That Worked | Dyes/Pigments That Did Not Work |
|---|---|
| Akrodye ™ Oil Yellow #6, E-6089 | Akrodye ™ Oil Black #4 (E-8540) |
| Akrodye ™ Oil Red #1, E-5883 | Ceres ™ Yellow |
| Akrodye ™ Oil Green #1 | Akrochem 626 Blue Powder |
| Akrodye ™ E-8855 Brown Powder | Akrosperse E-98 Blue Paste |
| Akrodye ™ Oil Orange #3 | Intrasperse Yellow GBA Extra |
| Akrodye ™ Oil Violet IRS | Intralan Yellow NW 250% |
| Morplas ™ Red 46 | Aluminum Faste |
| Automate ™ Yellow 126 | 2B-Extra Concentrate Blue Dye |
| Automate ™ Red B | Precipitated Azo Pigment |
| Ceres ™ Red | Red Iron Oxide |
| Morplas ™ Yellow 33 | |
| Pylakrome ® Red LX-1903 | |
| Pylakrome ™ Yellow LX-1913A | |
| Pylarm ™ Blue LX-7270 | |

To illustrate the color enhancing effect of a clear urethane coating white test panels were dyed with either yellow, blue, and red colors.

White sidewall test pieces (4×4 cm×8.8 cm) were immersed in yellow (Akrodye® Oil Yellow #6), red (Akrodye® Oil Red #1) and blue (Pylam® Blue LX7329) dye solutions and dried overnight forming three specimen of each color. The white sidewall tests pieces were high in butyl rubber and similar to those in Table V. The first specimen of each color was left uncoated. The second specimen was dipped in neat, Sancure®776 from the B.F. Goodrich Co., in Brecksville, Ohio followed by drying in an oven at 138° C. for 15 minutes. Sancure® 776 is an aliphatic urethane polymer dispersion in water with about 35 weight percent solids that can be crosslinked with melamine or a polyfunctional aziridine. In this example it was cured with 5 parts of Sancure® 89 (a modified melamine crosslinker from the B.F. Goodrich Company) per 100 parts by weight of Sancure® 776. Other urethane dispersions in water having good adhesion to rubber could have been used. A third specimen was dipped in Sancure® 776 with 1 wt. % Tinuvin® 292 and 1 wt. % Tinuvin® 1130 and oven dried at 138° C. for 15 minutes. Tinuvin® 292 is a 80:20 mixture of bis(1,2,2,6,6-pentamethyl-4-piperidinyl) sebacate and methyl(1,2,2,6,6-pentamethyl-4-piperidinyl) sebacate. Tinuvin® 1130 is a mixture of poly (oxy-1,2-ethanediyl), alpha-[3-[3-(2H-benzotriazol-2-yl)-5-(1,1-dimethylethyl)4-hydroxylphenyl]-1-oxopropyl]-omega-[3-[3- (2H-benzotriazo-2-yl)-5-(1,1-dimethylethyl)-4-hydroxyphenyl]-1-oxopropoxy]-; poly(oxy-1,2-ethanediyl), alpha-[3-[3-(2H-benzotriazol-2-yl)-5-(1,1-dimethylethyl)4-hydroxyphenyl]-1-oxopropyl]-omega hydroxy-; and polyethylene glycol. They are available from Ciba-Geigy Corp. in Tarrytown, N.Y. Color readings for the specimen were determined before and after accelerated weathering tests (168 hrs QUV and 150 hrs Fadeometer. The QUV test equipment used is from the Q-Panel Company in Cleveland, Ohio and was equipped with a UV313B lamp. The results using ASTM E-308-94a and a Hunter Ultrascan™ are shown in Table VIII below.

TABLE VIII

Hunter Color Indices After coating and Accelerated Weathering of Dyed White Sidewall Test Plaques

| Color | Coating | Color @ Indices | Color Original | Color 168 h QUV | Color 150 h FM** |
|---|---|---|---|---|---|
| Yellow | None | b* | 23 | 34 | 3 |
| Yellow | Urethane | b* | 93 | 82 | 21 |
| Yellow | Ureth + T | b* | 95 | 82 | 26 |
| Blue | None | −b* | 3.5 | −13*** | −2*** |
| Blue | Urethane | −b* | 26 | −19*** | 1 |
| Blue | Ureth + T | −b* | 25 | −8*** | 2 |
| Red | None | a* | 21 | 15 | 4 |
| Red | Urethane | a* | 60 | 28 | 7 |
| Red | Ureth + T | a* | 59 | 39 | 6 |

@ "b*" measures yellowness when plus, blueness when minus and "a*" measures redness when plus.
**FM stands for fadeometer and the general method is described in ASTM D750-96.
***Light blue in appearance although "−b*" values are negatives.

The results above indicate the urethane coating adds to color intensity and the Tinuvin® additives help stabilize the colors in accelerated QUV or Fadeometer tests.

Three raised white letters of a tire were dyed using Akrodye™ Oil Yellow #6 in Shell Sol™142 HT. The control was left uncoated, a dyed letter was coated with the first polyurethane coating above with no stabilizers, and a dyed letter was coated with the second polyurethane coating above with 1 weight percent of both Tinuvin™ 292 and 1130. All three raised white letters were placed in roof sunlight exposure for three weeks in Akron, Ohio and visually examined after the three weeks. The letters coated with either the first or second polyurethane coatings remained as bright as original letter color but the uncoated control letter faded. These two experiments above illustrate the benefits of enhanced color intensity and color stability which can be achieved with polyurethane coatings.

Examples of Coloring Uncured Opaque Rubber Compounds

Example I used a white sidewall compound similar to the one shown in Table I. The white sidewall compound was in the form of a 6"×6"×⅛" piece of uncured compound. Two grams of Akrodye Oil Yellow were blended on a hot plate with 10 grams of refined petroleum wax and applied hot onto the outside of the white sidewall compound. A black uncured coverstrip was then applied over the white sidewall compound. The composite sheet was cured for 30 minutes at 150° C. under 5 tons pressure. The cured material was examined and the yellow dye was uniformly dispersed in the white sidewall surface with a dye penetration layer.

Example J basically duplicated Example I but a naphthenic/paraffinic medium process oil was substituted for the wax and the dye solution was applied at room temperature (23° C.). Upon examination of the cross section of the cured white sidewall compound the yellow dye was uniformly dispersed over a part of the thickness of the previously white sidewall.

Examples I and J illustrate that the combination of an uncured opaque rubber compound, application in a conventional rubber compounding additive, and exposure to elevated temperatures during curing allows for good dye penetration on white sidewall compounds which are generally considered non-staining.

An example of dyeing a crosslinked white sidewall (control Example K) and coloring the same white sidewall compound prior to crosslinking, Example L, illustrates the ability to trap or stabilize the color by applying it prior to crosslinking. Control Example K was prepared by applying 0.5 g of Pylakrome Fluorescent Orange LX-10093 dissolved in 7.7 g of Shell Sol® 142 HT to a raised white letter and drying. The letter became light orange and subsequently faded after two months exposure to a fluorescent light. Example L was prepared by applying the same solution to a 6"×6"×0.1" uncured white sidewall compound, drying the coated specimen, and crosslinking under heat and pressure. The cured compound was cut in cross section to reveal that the color penetrated to 0.07". A dark orange color developed that remained as original during two months exposure to fluorescent light. The difference in color intensity and color trapping or stability due to coloring prior to completing crosslinking is illustrated by comparing Example L to Control Example K.

Example M was prepared by applying 0.3 g of Pylakrome Fluorescent Orange LX-10093 dissolved in 7.1 g of naphthenic/paraffinic medium process oil to a 6"×6"×0.1" uncured white sidewall compound and then immediately curing the compound. The cured compound was cut in cross section to reveal that the color penetrated to 0.06". A dark orange surface color on the sample was stable to fluorescent light for two months, similar to Example L.

The processes of Examples I, J, and M are preferred over the processes of the previous examples as the total extra elapsed time to produce a colored sidewall is only the time required to apply the dye (i.e. there is no drying step) and the other steps are inherently necessary in manufacturing conventional white sidewall tire. The process of Examples I, J, and M are also preferred over the prior examples as no volatile organic solvent was released into the environment as a consequence of the process. Examples I, J, and M generally produce more intense colors than the prior examples with slower rates of fading on U.V. exposure.

The process of Examples I, J, and M are preferred over pigmenting the white sidewall compound because a multitude of different colored sidewall compounds can be prepared with a single Banbury mixer and extruding equipment. With processes I, J, and M there is little opportunity to contaminate the mixing equipment or subsequent batches with earlier prepared colors. Switching colors only requires changing the dye solutions and dye applicator equipment. If pigments were used, the Banbury mixer and extruder would both have to be purged and cleaned of any remaining pigment/rubber compound before a subsequent batch of a different colored sidewall could be processed.

While in accordance with the Patent Statutes, the best mode and preferred embodiment has been set forth, the scope of the invention is not limited thereto, but rather by the scope of the attached claims.

What is claimed is:

1. A process for coloring an opaque non-black rubber component of a pneumatic tire, said process comprising:
    a) compounding and mixing a non-black rubber compound including at least 50 PHR of a copolymer having at least 50 weight percent repeating units from a monoisoolefin of 4 to 7 carbon atoms;
    b) applying a dye mixed with at least one low molecular weight rubber plasticizing additive, wherein said additive is a liquid, at temperatures in the range of about 20° C. to about 120° C., to at least one external surface of said rubber compound prior to curing said rubber compound to form a colored rubber compound substantially without the use of a volatile organic solvent;
    c) assembling said colored rubber compound into an uncured pneumatic tire; and
    d) molding and crosslinking said pneumatic tire thereby producing a tire with at least one colored non-black rubber component.

2. A process according to claim 1, wherein said dye is mixed with either a plasticizer for a rubber, or a wax, or combinations thereof.

3. A process according to claim 2, wherein a black rubber coverstrip is applied over said colored rubber compound before it is assembled into a pneumatic tire.

4. A process for coloring an opaque non-black rubber component of a pneumatic tire, said process comprising;
    a) compounding and mixing an opaque non-black rubber compound including at least 50 PHR of a copolymer having at least 50 weight percent repeating units from a monoisoolefin of 4 to 7 carbon atoms and a sufficient amount of white pigment to make the rubber compound opaque;
    b) applying a dye mixed with either a plasticizer for a rubber or a wax, or combinations thereof, to at least one external surface of said rubber compound prior to curing said rubber compound to form a colored rubber compound substantially without the use of a volatile organic solvent;
    c) assembling said colored rubber compound into an uncured pneumatic tire; and
    d) molding and crosslinking said pneumatic tire thereby producing a tire with at least one opaque non-black colored rubber component.

5. A process according to claim 4, wherein a black rubber coverstrip is applied over said colored rubber compound before it is assembled into a pneumatic tire.

6. A process according to claim 4, wherein said white pigment is $TiO_2$ present in an amount of at least 20 PHR.

7. A process according to claim 4, wherein opaque is defined as having less than a 2% change in the L value of a 1 mm thick specimen according to CIE 1976 L* scale when a black backup plate is substituted for a white backup plate for the sample in the test.

8. A process according to claim 4, wherein opaque is defined as having less than a 2% change in the L value of a 0.5 mm thick specimen according to CIE 1976 L* scale when a black backup plate is substituted for a white backup plate for the sample in the test.

9. A process according to claim 4, wherein the dye forms a dye penetration layer by only penetrating partially through said opaque non-black rubber component.

* * * * *